April 14, 1964  A. W. HOLSTEIN ETAL  3,128,908
DISPENSER FOR A VENDING MACHINE
Filed April 7, 1961  12 Sheets-Sheet 1

Alvin W. Holstein,
Robert N. Cox,
Leonard A. Ficken,
Inventors.
Koenig, Pope,
Senniger and Powers,
Attorneys.

April 14, 1964   A. W. HOLSTEIN ETAL   3,128,908
DISPENSER FOR A VENDING MACHINE
Filed April 7, 1961   12 Sheets-Sheet 2

April 14, 1964    A. W. HOLSTEIN ETAL    3,128,908
DISPENSER FOR A VENDING MACHINE
Filed April 7, 1961    12 Sheets-Sheet 3

April 14, 1964 A. W. HOLSTEIN ETAL 3,128,908
DISPENSER FOR A VENDING MACHINE
Filed April 7, 1961 12 Sheets-Sheet 8

United States Patent Office 3,128,908
Patented Apr. 14, 1964

3,128,908
DISPENSER FOR A VENDING MACHINE
Alvin W. Holstein, Brentwood, Robert N. Cox, Bridgeton, and Leonard A. Ficken, St. Louis County, Mo., assignors, by mesne assignments, to Universal Match Corporation, Ferguson, Mo., a corporation of Delaware
Filed Apr. 7, 1961, Ser. No. 101,466
19 Claims. (Cl. 221—105)

This invention relates to vending machines, and more particularly to cigarette vending machines.

Among the several objects of the invention may be noted the provision of improved dispensing apparatus for a vending machine, and more particularly a cigarette vending machine, which is adapted to carry a relatively large number of different brands of cigarettes, and a relatively large number of packs of each different brand, and which despite its high capacity is relatively compact in size; the provision of dispensing apparatus such as described which, while having front and rear banks of vending columns for high capacity, is not of excessive depth; the provision of dispensing apparatus such as described in which the front bank of columns includes shift columns for holding reserve stacks of items to be vended; the provision of dispensing apparatus such as described in which the front bank of columns is adapted readily to be shifted to a position providing for loading the front columns from their upper ends and providing for access to the rear columns for loading the latter from the front; and the provision of dispensing apparatus such as described having certain control mechanism which is common to ejection of items from both the front and the rear columns. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated.

Corresponding reference characters indicate corresponding parts throughout the several views of the drawings.

Figure 8:
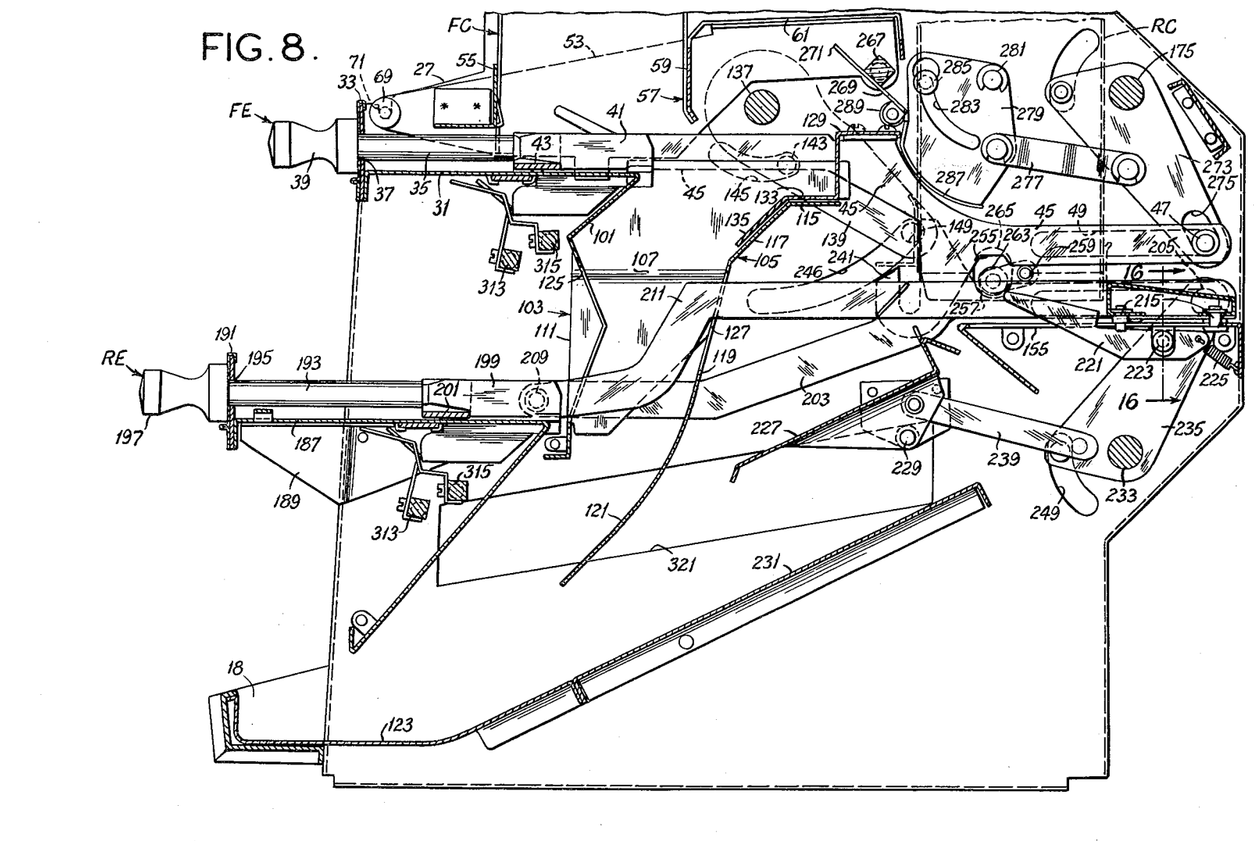
FIG. 8 is an enlarged vertical section taken on line 8—8 of FIG. 3.
Figure 12:
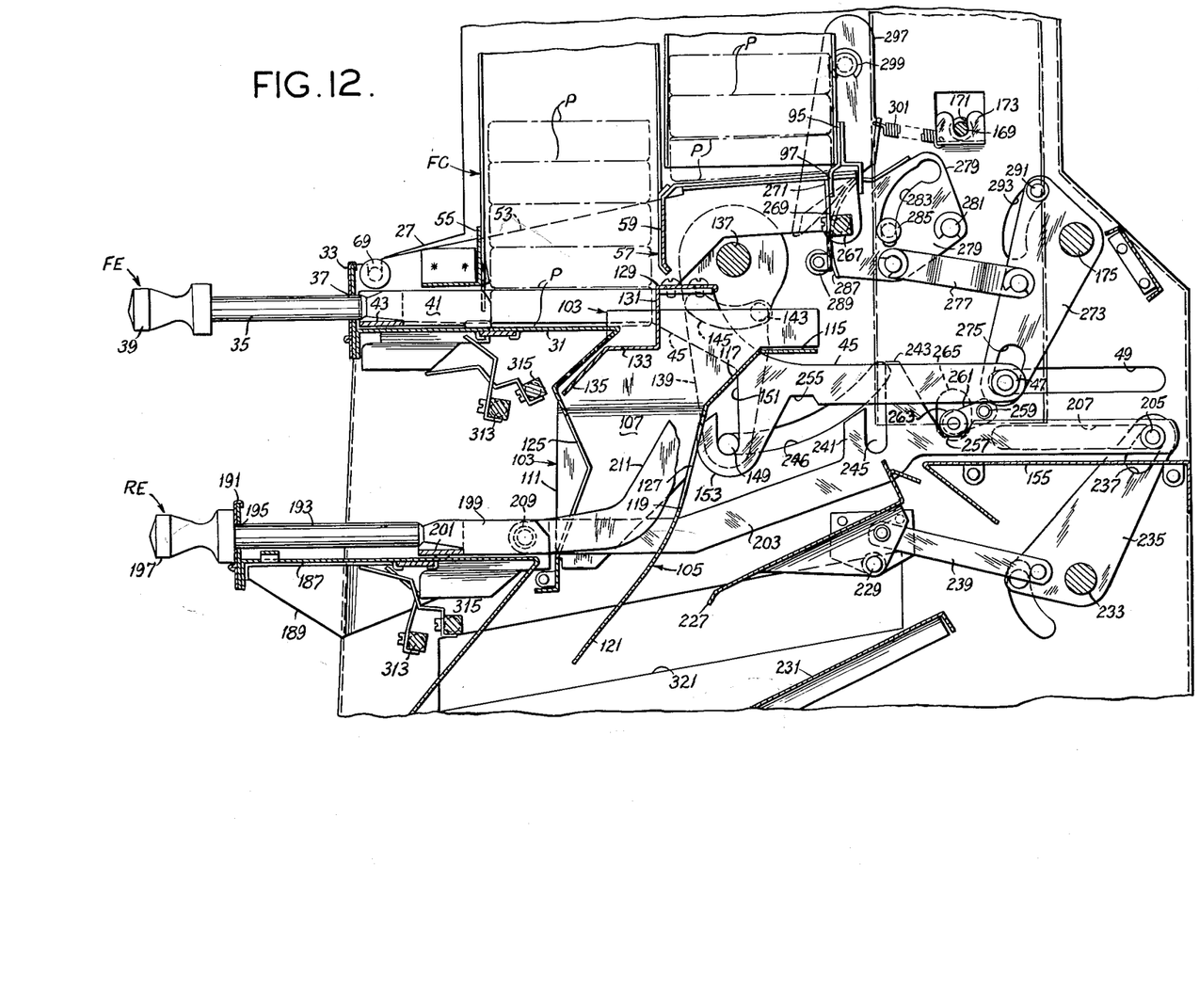
FIG. 12 is a view similar to FIG. 8 showing moved positions of certain parts.
Figure 13:
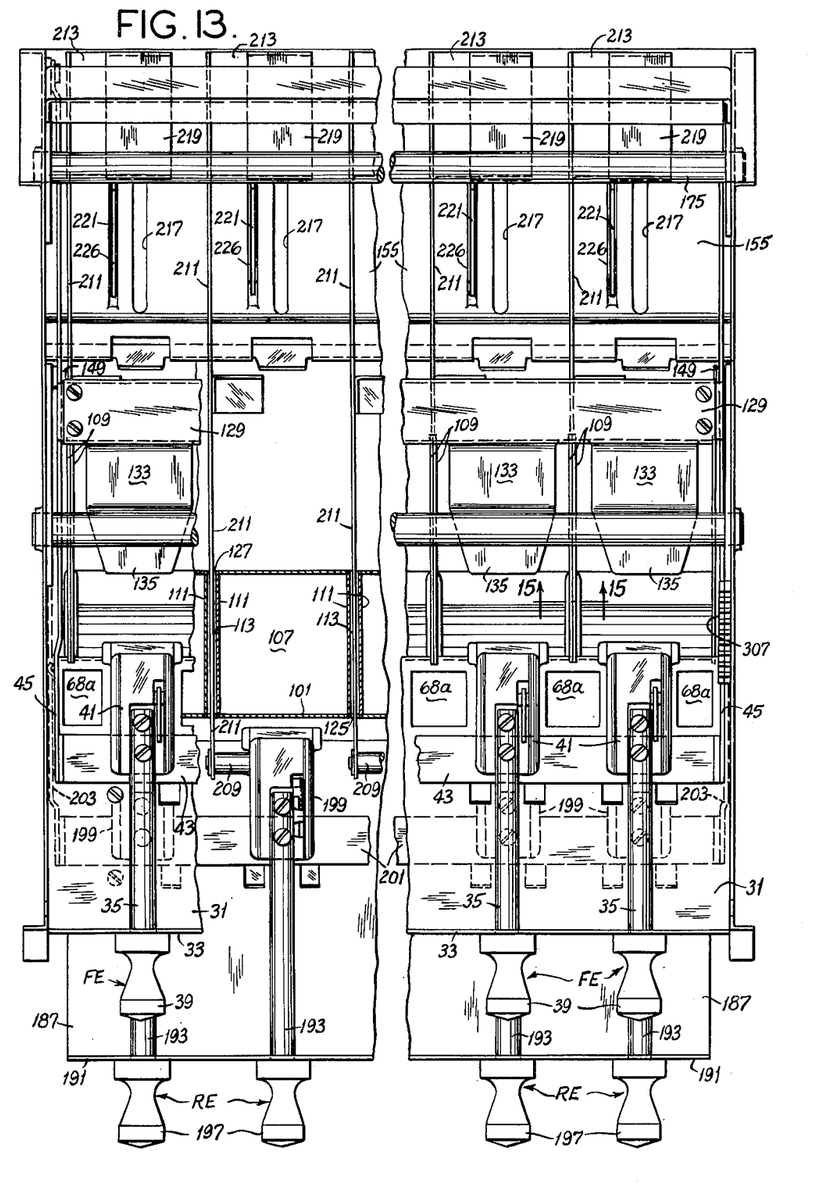
FIG. 13 is a plan view with all columns of the dispensing apparatus removed, and with certain other parts broken away to show details at a lower level of the apparatus.

In FIGS. 8 and 12, a rear column is shown in phantom for better illustration of parts otherwise concealed thereby, and in FIG. 12 certain parts have been broken away.

Figure 1:
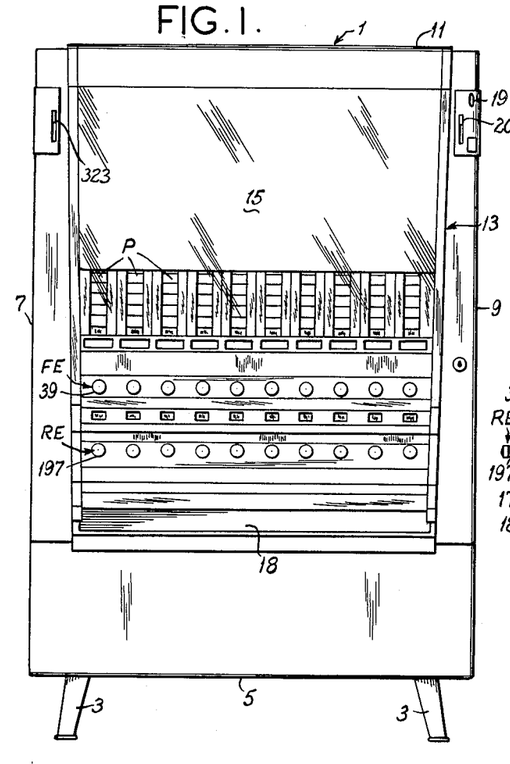
FIG. 1 is a front elevation of the machine.
Figure 2:
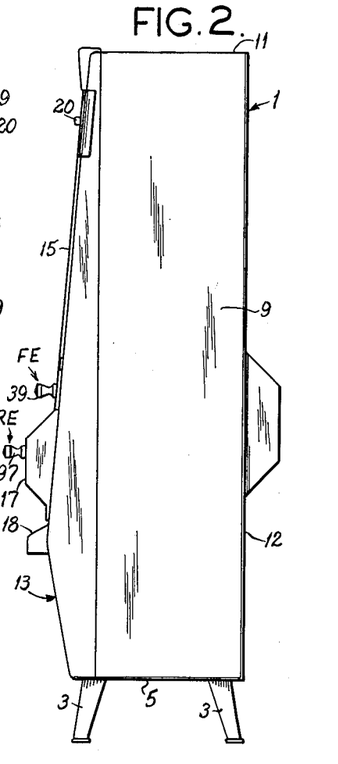
FIG. 2 is a side elevation of the machine.

Referring to the drawings, there is indicated at 1 in FIGS. 1 and 2 a cigarette vending machine cabinet standing on legs 3. The cabinet has a bottom 5, left and right side walls 7 and 9 (left and right being as viewed from the front of the cabinet), a top wall 11, a back wall 12 and a front door 13. The door has an inclined front panel 15 with a forward offset 17 toward its lower end, and below this offset there is an access opening 18. Shown at the upper right of the door are the usual coin slot 19 and coin return knob 20.

Figure 3:
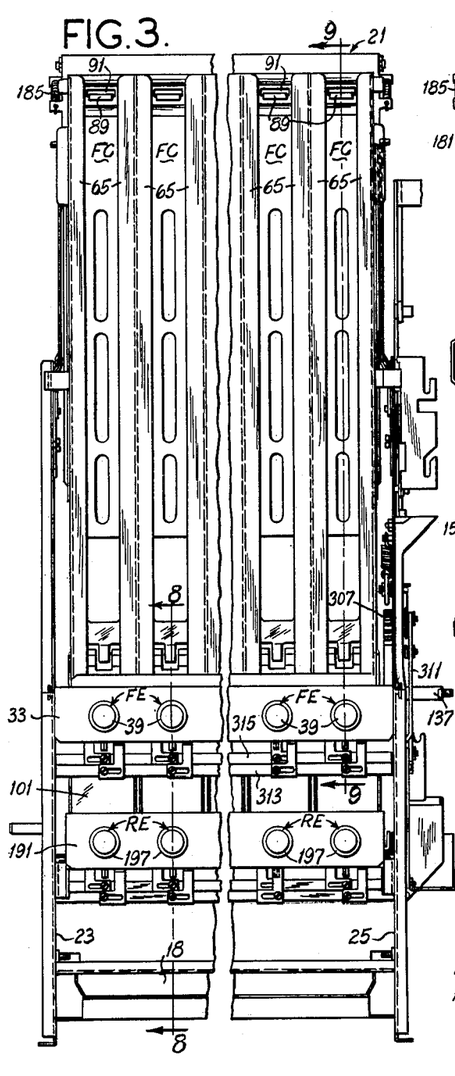
FIG. 3 is a front elevation of the dispensing apparatus contained within the cabinet of the machine, parts being broken away to reduce the width of the view.
Figure 4:
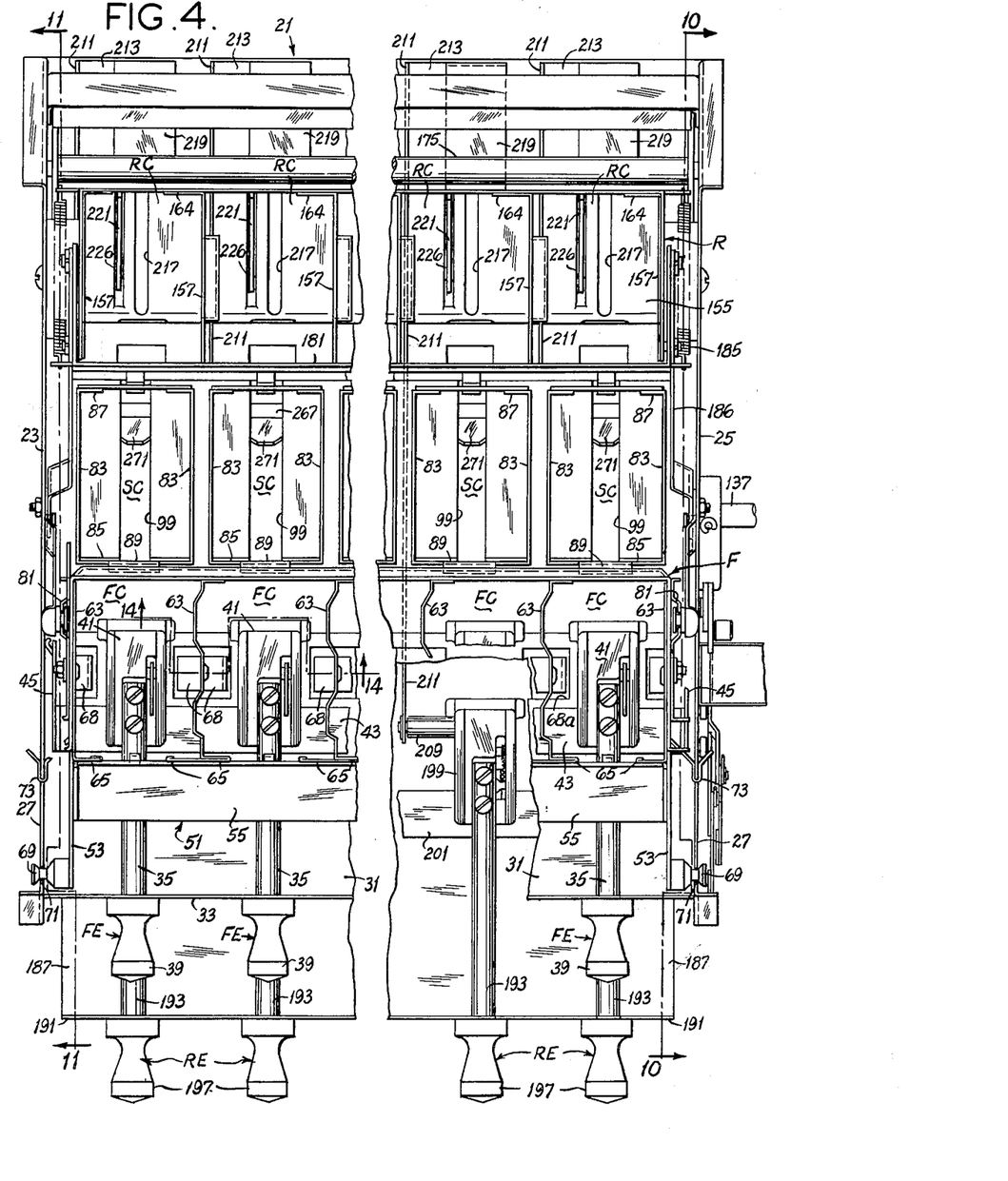
FIG. 4 is a plan view of FIG. 3, on a larger scale than FIG. 3, with parts broken away to reduce the width of the view and other parts broken away to show certain details.

Housed in the cabinet is a dispensing apparatus of this invention, designated in its entirety by the reference character 21 see FIGS. 3 and 4). This comprises a frame including left and right side walls 23 and 25. Located between side walls 23 and 25 are front and rear column assemblies designated in their entirety by reference characters F and R, respectively. The front column assembly F comprises a bank of primary columns, each designated FC, located side-byside, and a plurality of so-called shift columns, each designated SC, one for each front primary column FC. The rear column assembly R comprises a bank of columns, each designated RC, located side-byside. There are no shift columns for the rear columns RC. Each column is adapted to hold a stack of packs P.

For each front column FC, there is an ejector FE, and for each rear column RC there is an ejector RE. Ejectors FE are arranged in a horizontal row slightly above the door offset 17 and are adapted to eject the bottom packs in the front columns FC rearward. Ejectors RE are arranged in a horizontal row below ejectors FE at the level of offset 17 and are adapted to eject the bottom packs in the rear columns RC forward.

Figure 5:
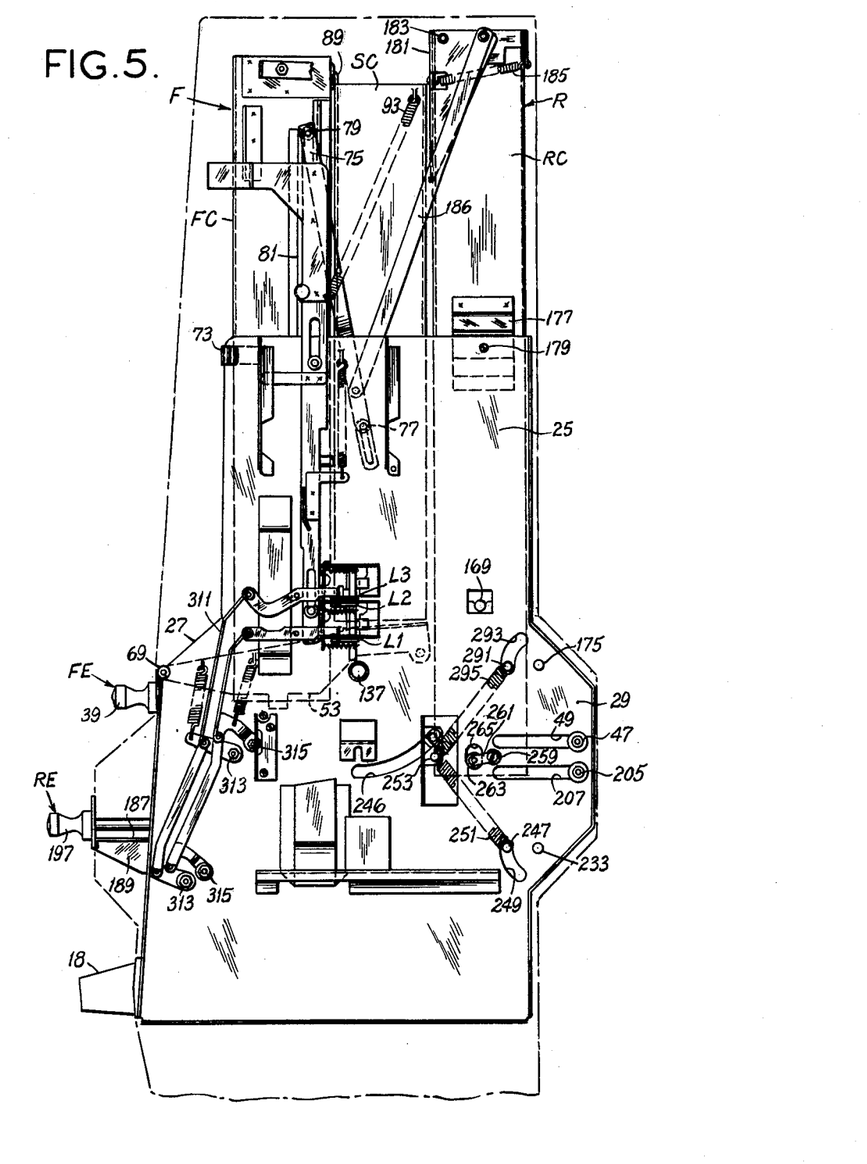
FIG. 5 is a right side elevation of FIG. 3, the outline of the cabinet being indicated by broken lines.
Figure 6:
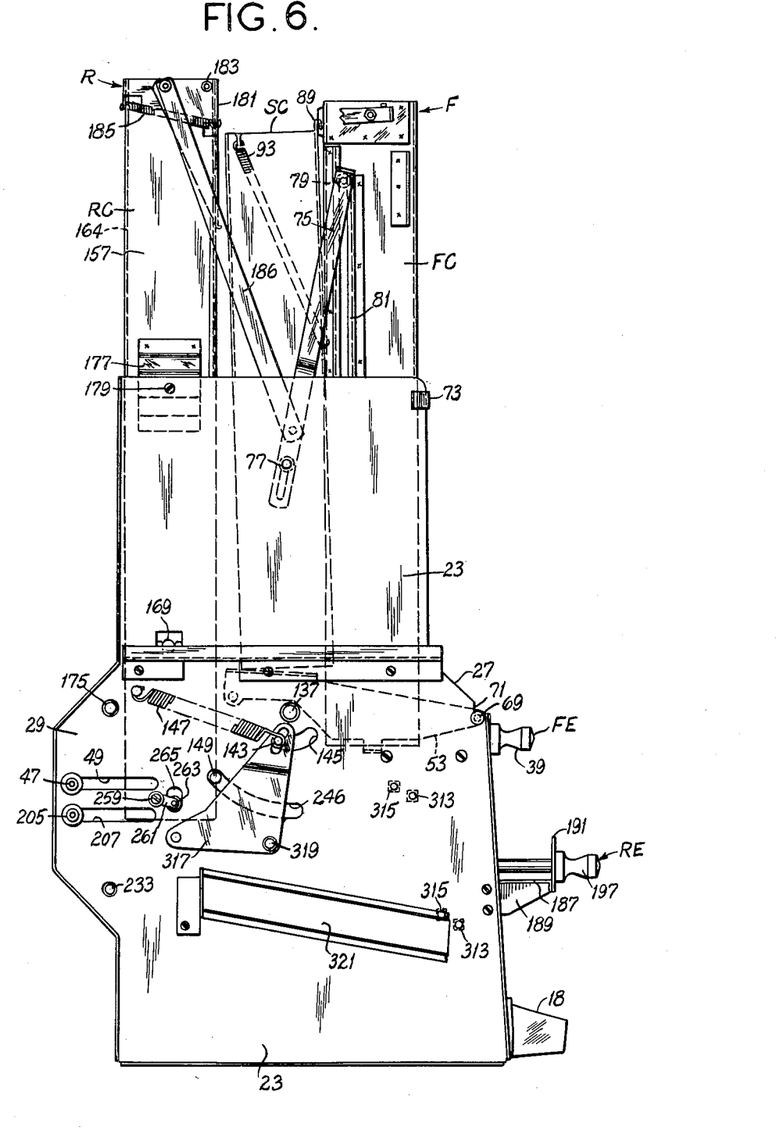
FIG. 6 is a left side elevation of FIG. 3.

The front edge of each of the side walls 23 and 25 has an inclined step as indicated at 27 (see FIGS. 5 and 6) about midway of the height of the wall. There is a trapezoidal projection 29 from the rear of each side wall. A horizontal shelf 31 (see FIGS. 4, 8, 10 and 11) extends between the side walls toward the front thereof and somewhat below the side wall steps 27. This front shelf 31 constitutes the bottom for the front columns FC. Fixed to the front of this shelf is an upstanding vertical plate 33. Each of ejectors FE for the front columns comprises a rod 35 extending slidably through a hole 37 in plate 33 and having a knob 39 on its forward end and a head 41 on its rearward end. The front door 13 has openings for the knobs, these openings being larger than the knobs so that the door may be opened over the knobs. The heads 41 may be provided with suitable empty locks, for locking any ejector FE out of operation when the respective front column FC is emptied, such as shown, for example, in U.S. Patent 2,823,782. A draw bar 43 extends from one side wall to the other on shelf 31 and is slidable on the shelf transversely with respect to the length of the bar and in forward and rearward direction as regards the entire dispensing apparatus. This bar is engageable by the ejector heads 41 so that it is moved forward from the rearward retracted position in which it appears in FIG. 8 when any ejector FE is pulled out. Suitable interlock mechanism such as is well known in the art is provided to prevent more than one ejector FE from being pulled out at a time. At each end of the draw bar is a rearwardly extending side arm 45. These side arms 45 are located closely adjacent the inside of the left and right side walls 23 and 25, and each has a stud 47 at its rearward end slidable in a horizontal slot 49 in the respective side wall. Slots 49 extend into the trapezoidal projections 29 of the side walls.

Figure 14:
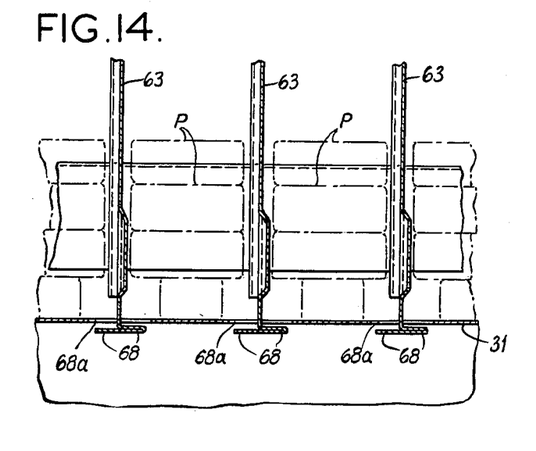
FIG. 14 is a vertical section taken on line 14—14 of FIG. 4.
Figure 16:
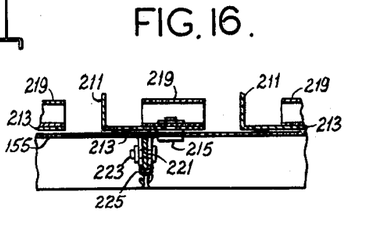
FIG. 16 is an enlarged vertical section taken on line 16—16 of FIG. 8.

The front column assembly F comprises a base frame designated in its entirety by reference character 51 and comprising left and right side arms, each designated 53, and forward and rearward frame members 55 and 57 extending between and secured at their ends to the arms. Member 55, as illustrated, is constituted by an anglesection bar. Member 57 has a generally vertical portion 59 which extends between arms 53 intermediate the ends of the arms and spaced rearward from bar 55 a distance corresponding to the length of a pack of cigarettes, and a shelf portion 61 extending rearward from the top of portion 59. Column partitions 63 have their lower ends located between bar 55 and portion 59 of member and secured thereto and define the individual primary front columns FC. The partitions have flanges such as indicated at 65 at their forward edges for retaining packs in the primary columns FC. The latter are wholly open at the rear for accommodation of the shift columns SC. Partitions 63 are braced at their upper ends by a brace 67 extending across the rear thereof. They extend below members 55 and 57 and have pack-supporting feet 68 at the bottom (see FIG. 14) accommodated in openings 68a in shelf 31.

Figures 7, 15:
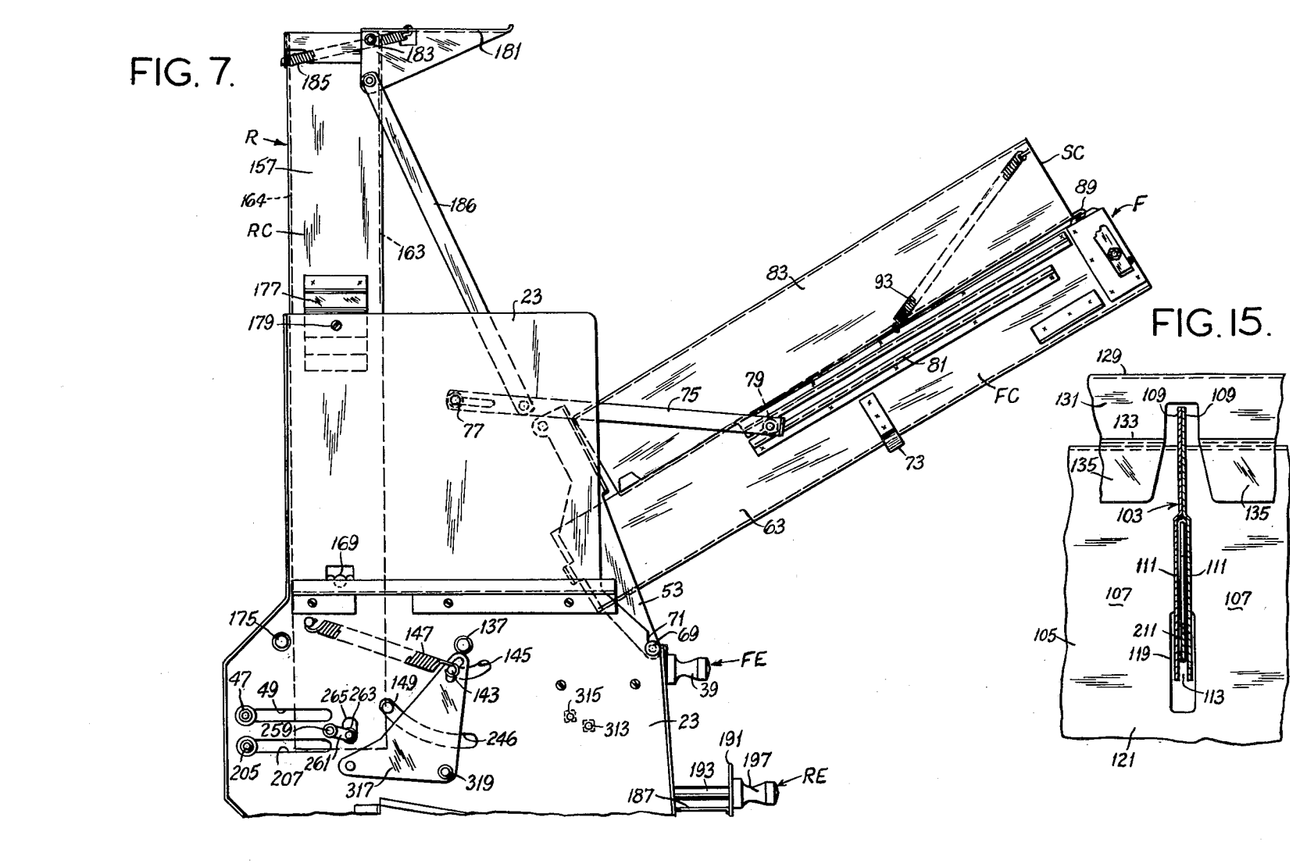
FIG. 7 is a view corresponding to FIG. 6 showing moved positions of certain parts.
FIG. 15 is a vertical section taken on line 15—15 of FIG. 13.

To facilitate loading, assembly F is swingable from a vertical position within cabinet 1 above the shelf 31 to the forwardly extending inclined position illustrated in FIG. 7. For this purpose, arms 53 extend forward beyond bar 55 and carry pivots 69 at their forward ends received in slots 71 in the steps 27 of the side walls 23 and 25. The entire assembly F is swingable on the horizontal axis of pivots 69. Rearward swing of the assembly is limited by engagement of hooks 73 on the end partitions 63 with the side walls. Forward swing of the assembly is limited as by means of arms 75 on the inside of the side walls each having a pin and slot connection 77 at one end with the respective side wall and a stud 79 at the other end slidable in a slotted track 81 on the respective end partition 63.

Each shift column SC has side walls 83, a front wall 85, and inwardly directed rear flanges 87. A hook 89 is formed at the top of the front wall 85 of each shift column and is hooked into a slot 91 in brace 67 for pivoting the shift column for movement into and out of the respective primary column FC. Springs such as indicated at 93 bias the shift columns to swing into the primary columns, and, as will be understood, the shift columns are normally held out of the primary columns by engagement of the front walls 85 of the shift columns with stacks of packs P in the primary columns. The shift columns hold reserve stacks of packs P bearing on shelf portion 61 of member 57 and, when the supply of packs in any primary column is depleted, the respective shift magazine swings into that primary column to replenish the supply. Each shift column has a strap 95 across its rear side at its lower end carrying a member 97 extending down into one of slots 99 in shelf portion 61.

Stacks of packs in the columns FC bear on the ejector heads 41. When any ejector E is pulled out (by pulling on the respective knob 39), the respective head 41 is withdrawn from under the respective stack, and the latter drops down onto the shelf 31. Then, when the ejector is returned rearward, the head 41 pushes the lowermost pack of the stack rearward off shelf 31, underneath portion 59 of member 57 of the assembly F. Shelf 31 has an apron 101 extending downward at its rear. Extending rearward from apron 101 are partitions, each generally designated 103, located in the planes of partitions 63 and defining in conjunction with a rearward apron 105 a plurality of chutes 107. Each partition 103 consists of two plates 109 which have upper portions engaged face-to face and lower portions 111 offset as shown best in FIG. 15 to provide passages 113 between chutes 107. The rearward apron 105 is carried by partitions 103. It has an upper horizontal flange portion 115, a portion 117 inclined forward and downward from the flange portion 115, and a portion 119 extending down from portion 117 and terminating in a curved portion 121 for delivery of packs to a pan 123 extending between side walls 23 and 25, accessible through access opening 18 in the front door 13 of cabinet 1. Apron 101 has vertical slots such as indicated at 125 receiving the forward ends of spaced lower portions 111 of partition plates 109, and apron 105 has vertical slots such as indicated at 127 in register with passages 113 defined by portions 111 of plates 109.

Extending between the draw bar side arms 45 is a horizontal crossbar 129 formed to have a downwardly extending forward flange 131 and a plurality of tongues 133, one for each front column FC and chute 107, extending forward from the bottom of flange 131. Each tongue has a forward end portion 135 inclined downward in forward direction. When the drawbar is in its rearward retracted position of FIGS. 8 and 11 (all ejectors FE retracted rearward), crossbar 129 is positioned above the rear of chutes 107, and tongues 133 extend forward over the horizontal flange portion 115 of apron 105, the inclined tongue ends 135 overlying the inclined portion 117 of apron 105. When any ejector FE is pulled out, the drawbar 43 and the associated drawbar side arms 45 and crossbar 129 carrying the tongues 133 move forward, the tongues thereupon come into a forward position such as illustrated in FIG. 12 toward the front chutes 107 with the inclined forward ends 135 of the tongues underlying the upper portion of apron 101 (which is inclined forward in downward direction as appears in FIG. 12 to accommodate the tongue ends 135 when they are in the stated forward position). Then, when the ejector FE returns rearward, and pushes the lowermost pack of the stack in the respective column FC rearward off shelf 31, the rear end of the pack rests on the respective tongue 133, which is also returning rearward with the ejector FE, until the return movement is nearly completed, at which point the forward end of the pack being ejected is pushed clear of the rearward edge of shelf 31, and the pack then tilts down on inclined tongue end 135, and slides off and down through the respective chute 107 to the pan 123.

A horizontal shaft 137 extends across the apparatus, journalled at its ends in side walls 23 and 25. This shaft is located at a level somewhat above that of crossbar 129 so that it does not interfere with forward movement of the crossbar, and above the inclined portion 117 of apron 105. Secured to this shaft on the inside of the left side wall 23 is a lever 139 (see FIGS. 8, 9, 11 and 12). Secured to this shaft on the inside of the right side wall 25 is a lever 141 (see FIG. 10). Lever 139 carries a stud 143 extending through an arcuate slot 145 in the left side wall (see FIGS. 6 and 7). A tension spring 147 connected between the left side wall and the stud 143 on the outside of the left side wall biases the lever 139 to swing counterclockwise as viewed from the right and thereby biases shaft 137 to rotate counterclockwise as viewed from the right. Lever 139 aslo carries a stud 149 engaging edge 151 of a hook formation 153 on the left drawbar arm 45. Lever 141 carries a stud 149 engaging edge 151 of an identical hook formation 153 on the right drawbar arm 45. Counterclockwise swing of the levers 139 and 141 is limited by engagement of studs 149 with edges 151 when the drawbar 43 and drawbar arms 45 are retracted. hen the drawbar 43 is moved forward by an ejector FE, edges 151, via engagement with studs 149, swing levers 139 and 141 away from their retracted position in which they appear in FIGS. 8, 10 and 11 against the return bias of spring 147. Lever 139 swings clockwise as viewed in FIGS. 8 and 11; lever 141 swings counterclockwise as viewed in FIG. 10. As the levels swing, studs 149 move downward and enter the hook formations 153 (see FIG. 12).

A horizontal shelf 155 extends between the side walls 23 and 25 toward the rear thereof at a level below shelf 31. This rear shelf 155 constitutes the bottom for the rear columns RC of the rear column assembly R. The latter comprises a plurality of partitions 157 having their lower ends extending between and secured to front and rear base members 159 and 161, respectively. The partitions have flanges such as indicated at 163 and 164 at their forward and rearward edges for confining stacks of packs in the columns RC defined thereby. Assembly R further comprises an intermediate brace 165 and an upper brace 167 for the partitions extending across the rear thereof. The partitions at the left and right sides of assembly R carry studs 169 which are received in notches 171 in brackets 173 struck in from the side walls 23 and 25 for supporting assembly R in position above shelf 155 with the bottom of the assembly spaced above the shelf. Assembly R fits in between the rear of shelf portion 61 and a horizontal shaft 175 extending between side walls 23 and 25 toward the rear of the apparatus, this shaft being journalled at its ends in the side walls. The partitions at the left and right sides of assembly R carry filler pieces 177 for receiving screws 179 extending through screw holes in the side walls securely to retain the assembly in place.

Figure 17:
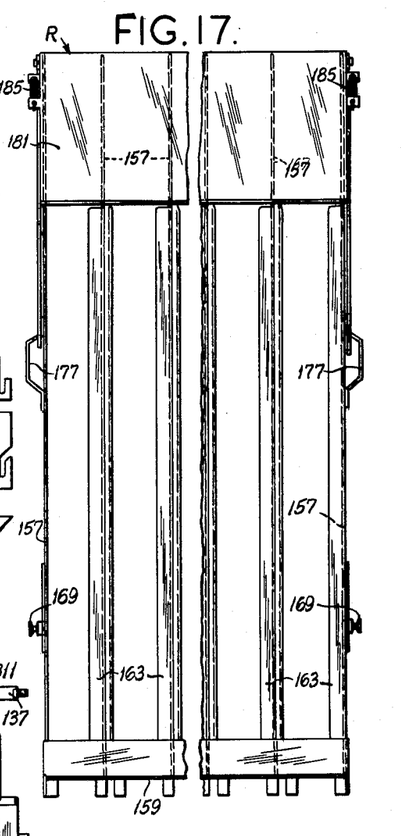
FIG. 17 is a front elevation of the rear bank of columns per se, with parts broken away to reduce the width of the view.

The front flanges 163 of the rear column partition plates 157 terminate short of the upper ends of the plates (see FIG. 17) to provide full-width openings for loading of packs into rear columns RC from the front thereof. A door 181 for closing these full-width openings is pivoted as indicated at 183 on the partitions at the left and right sides of the rear column assembly R and biased closed by springs as indicated at 185. Links 186 connect the door and arms 75, the arrangement being such that when the front column assembly F is swung forward for loading, door 181 is swung open against the closing bias of the springs (see FIG. 7).

A horizontal plate 187 (see FIGS. 8 and 10–12) extends between the side walls 23 and 25 toward the front thereof below the shelf 31, also at a level somewhat below that of shelf 155. This plate 187 projects forward from between the side walls, being supported on brackets 189 projecting out from the side walls. Fixed to the front of plate 187 is an upstanding vertical plate 191. Each of ejectors RE for the rear columns RC comprises a rod 193 extending slidably through a hole 195 in plate 191 and having a knob 197 on its forward end and a head 199 on its rearward end. The front door 13 has openings for knobs 197, these openings being larger than the knobs so that the door may be opened over the knobs. A drawbar 201 extends from one side wall to the other on plate 187 and is slidable on the plate transversely with respect to the length of the bar and in forward and rearward direction as regards the entire dispensing apparatus. This bar is engageable by heads 199 so that it is moved forward from the rearward retracted position in which it appears in FIG. 8 when any ejector RE is pulled out. Suitable interlock mechanism such as is well known in the art is provided to prevent more than one ejector RE from being pulled out at a time. At each end of drawbar 201 is a rearwardly extending side arm 203. These side arms 203 are located closely adjacent the inside of the left and right side walls 23 and 25, and each has a stud 205 at its rearward end slidable in a horizontal slot 207 in the respective side wall, slots 207 being located directly below slots 49.

The rear columns RC are located in the front-to-rear vertical planes of the front columns FC, and the rods 193 and heads 199 of the ejectors RE for the rear columns are located in the front-to-rear vertical planes of the rods 35 and heads 41 of the ejectors FE for the front columns. Stacks of packs in the rear columns bear directly on the shelf 155. As to each ejector RE, the head 199 thereof has a stud 209 projecting laterally to the left. Extending rearward from the left end of this stud through the respective passage 113 is a rod 211 formed from sheet metal stock. Each rod 211 extends rearward over the shelf 155 and, at its rearward end, has a horizontal flange 213 extending toward the right from the rod under the respective rear column RC and slidable on the shelf 155. Studs 215 extend down from the flange through a guide slot 217 in the shelf 155. On the flange 213 is a pusher 219 for pushing the lowermost pack of the stack in the respective rear column RC forward on shelf 155 upon forward movement of the pusher. As will be apparent, when any knob 197 is pulled out, the respective pusher 219 is moved forward for such ejection of a pack from the respective rear column. As the pusher moves forward, the stack bears on the pusher, and when the pusher returns rearward the stack drops down onto the shelf 155.

Means is provided for locking any ejector RE out of operation when the respective rear column is empty. As shown, this comprises a latch 221 pivoted at 223 below shelf 187 and biased by a spring 225 toward a locking position extending upward through a slot 226 in the shelf 155 in which it lies in the path of the flange 213 on the respective ejector rod 211. The latch is normally held down in retracted position against the bias of spring 225 by a pack or packs in the respective rear column, but when the last pack is ejected, the latch swings up into locking position. Thereupon, the respective ejector RE is locked out of operation by engagement of flange 213 with the latch.

Extending between the side walls 23 and 25 toward the front of shelf 155 is a trap 227 (see FIGS. 8 and 10–12) pivotally mounted at its ends on the side walls as indicated at 229 for swinging movement on a horizontal axis located below the forward edge of this shelf. This trap normally occupies a pack delivery position in which it appears in FIGS. 8, 10 and 12 and in solid lines in FIG. 11 inclined downward in forward direction. Means is provided for swinging trap upward to a horizontal position for receiving a pack being pushed forward by any rear column ejection RE as the latter is pulled forward, and then returning the trap to its inclined delivery position, whereupon the pack slides off the trap and down onto an inclined panel 231 for delivery below the chutes 107 to the pan 123. This means comprises a horizontal shaft 233 extending across the apparatus below the shelf 155 and journalled at its ends on the side walls 23 and 25. Secured to this shaft on the inside of the side walls are cranks 235 having slots 237 receiving studs 205 on drawbar side arms 203, the arrangement being such that when any ejector RE is pulled out, cranks 235 swing forward. Links 239 connect cranks 235 to the trap 227 for swinging the trap upward on forward swing of the cranks (see the dotted line position of the trap 227 shown in FIG. 11) and vice versa.

Each of the drawbar side arms 203 has upwardly extending forward and rearward fingers 241 and 243 defining a slot 245. The rearward finger on the left side arm 203 extends up above the stud 149 on lever 139 when the latter is in retracted position, and the forward finger terminates below the level of this stud. The rearward finger 243 on the right side arm 203 extends up above the stud 149 on lever 141 when the latter is in retracted position, and the forward finger terminates below the level of this stud. The arrangement is such that when drawbar 201 is moved forward by pulling out any one of the ejectors RE, the rearward fingers 243 on the drawbar side arms 203, via engagement with studs 149, swing the levers 139 and 141 away from their retracted position in which they appear in FIGS. 8, 10 and 11 against the return bias of spring 147. As the levers swing away from retracted position, studs 149 move downward and enter the slots 245. Hook formations 153 on the side arms 45 of the upper drawbar 43 are so formed as to permit studs 149 to move forward away from retracted position on forward movement of side arms 203 of drawbar 201 without accompanying movement of side arms 45 of drawbar 43. Studs 149 also move forward away from retracted position on forward movement of side arms 45 of drawbar 43 without accompanying movement of side arms 203 of drawbar 201 in view of forward fingers 241 on arms 203 terminating below the level of the studs. Studs 149 are accommodated in arcuate slots 246 in the side walls. The right-hand crank 235 carries a stud 247 projecting laterally through an arcuate slot 249 in the right side wall 25 (see FIG. 5). A tension spring 251 is connected between this stud and a stud 253 on the right side wall for biasing both cranks 235 toward retracted position, and thereby assisting in providing return bias on the side arms 203 of drawbar 201, also on the trap 227.

Means is provided for preventing any rear column ejector RE from being pulled out when any front column ejector FE is pulled out, and vice versa. For this purpose, each upper drawbar side arm 45 has a bottom notch 255 immediately rearward of its hook formation 153, and each lower drawbar side arm 203 has a notch 257 in the top immediately rearward of finger 243. Pivoted at 259 on the outside of each of side walls 23 and 25 (see FIGS. 5 and 6) carrying a stud 263 extending inward through a slot 265 in the side wall. The studs 263 are normally received in notches 257 in arms 203, being gravity-biased down into these notches. When the upper drawbar arms 45 move forward, portions of these arms rearward of notches 255 come over studs 263 and hold them down in notches 257 to lock arms 203 from moving forward, thereby locking the lower drawbar 201 and all the lower ejectors RE. When the lower drawbar arms 203 move forward, studs 263 are cammed upward into notches 255 (notches 257 being so formed as to accomplish this) and are held up in notches 255 by bearing on the upper edges of the portions of arms 203 rearward of notches 257, thereby locking the upper drawbar side arms 45 against movement and consequently locking the upper drawbar 43 and all the upper ejectors FE.

Figure 9:
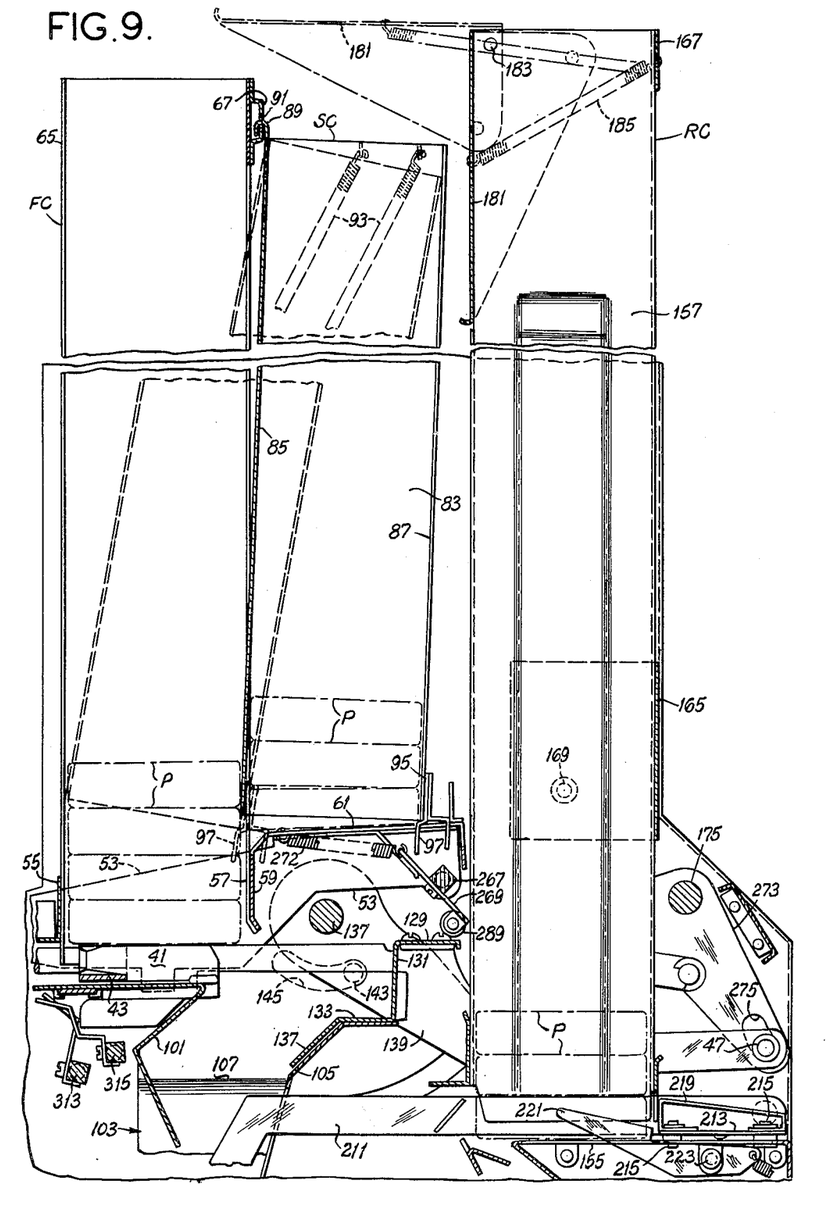
FIG. 9 is an enlarged vertical section taken on line 9—9 of FIG. 3.
Figure 10:
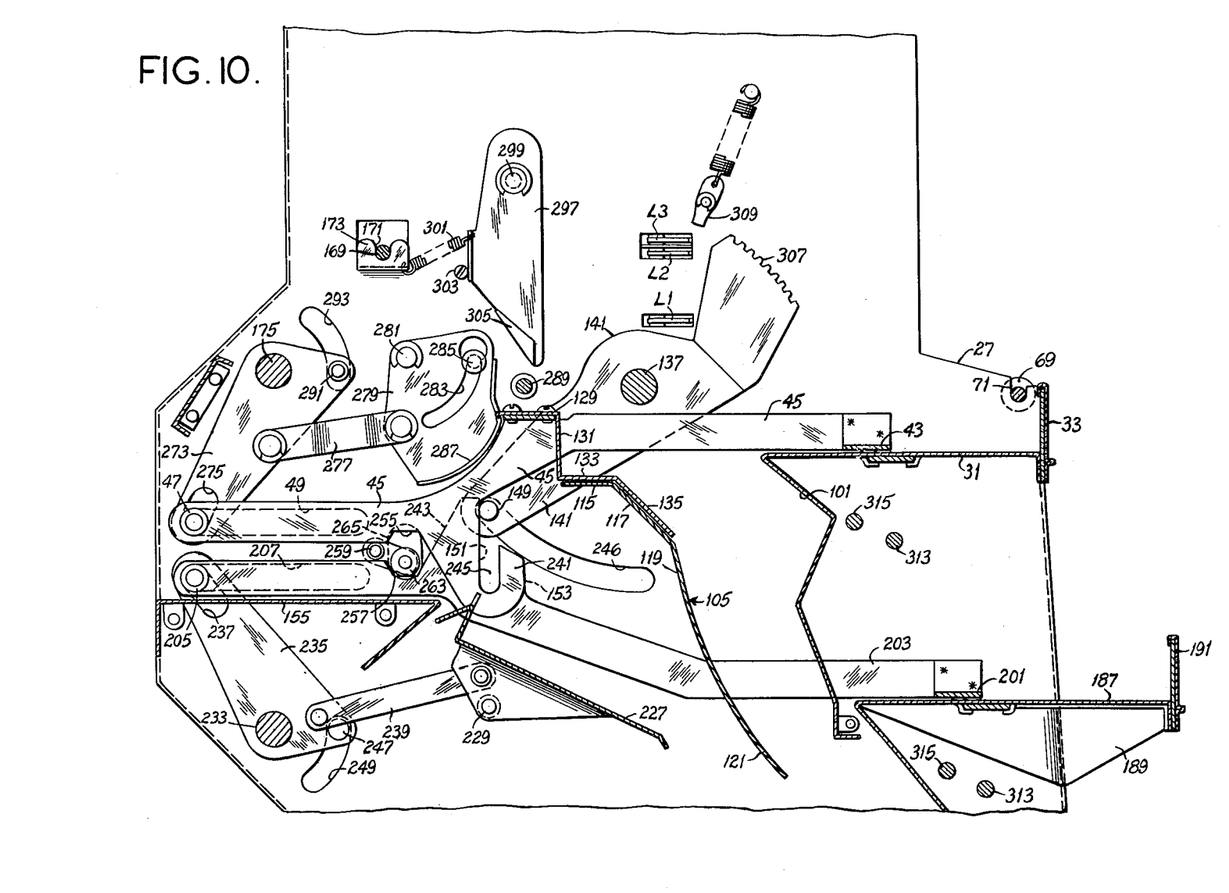
FIG. 10 is a vertical section taken on line 10—10 of FIG. 4.

Means is provided for retracting all the shift columns SC whenever an ejector FE is pulled out and returned to relieve the pressure of the front wall 85 of the shift column on the stack in the respective primary front column FC so that the stack in the primary column may drop freely downward. As shown in FIGS. 8, 9 and 12, this means comprises a shaft 267 (shown as a shaft of square cross section) extending between and journalled at its ends toward the rear of side arms 53 of the base frame 51 of the front column assembly 51. Fixed to this shaft is a plate 269. This plate extends from one end of shaft 267 to the other and is formed with a plurality of upwardly extending fingers 271, one for each shift column (see FIG. 4). Plate 269 is biased by a spring 272 to rock to the retracted inclined position in which it appears in FIG. 8. Means is provided for rocking plate 269 in clockwise direction as viewed in FIG. 8 away from its retracted position against the return bias of spring 272 and then back to retracted position each time any ejector FE is pulled out and returned. This means comprises the previously mentioned shaft 175, which is provided at its ends on the inside of side walls 23 and 25 with levers 273 having slots 275 receiving studs 47 at the rearward end of side arms 45 of the drawbar 43. Each lever 273 is connected by a link 277 to a lever 279 pivoted as indicated at 281 on the inside of the respective side wall. Each lever 279 has an arcuate slot 283 centered in pivot 281 receiving a stud 285 on the respective side wall. Each lever 279 has a curved flange portion 287 which constitutes a cam engageable with a follower roll 289 on the respective end of plate 269 offset from the pivot axis of plate 269. The arrangement is such that when any ejector FE is pulled out, with resultant forward movement of drawbar 43 and drawbar side arms 45, levers 273 are rocked forward and act through links 277 to rock cam levers 279 forward with resultant swing of plate 269 away from its retracted position (see FIG. 12). As plate 269 swings away from its retracted position, fingers 271 on the plate engage members 97 of the shift columns to swing all the shift columns rearward, thereby relieving the pressure of the front walls 85 of the shift columns on the stacks in the primary front columns FC. Then, when the drawbar 43 and side arms 45 return rearward to retracted position, levers 273 and 279 and plate 269 return to retracted position. The right-hand lever 273 carries a stud 291 extending laterally outward through a slot 293 in the right side wall 25. A tension spring 295 is interconnected between stud 253 and stud 293 for assisting spring 147 in providing a return bias for drawbar 43 and the parts associated therewith.

Means is also provided for retracting all the shift columns SC whenever rthe front column assembly F is swung back into the cabinet 1 from its forwardly extending position after loading in order to relieve pressure of the front walls 85 of the shift columns SC on the stacks in the primary front columns FC to enable these stacks to drop freely downward. This means comprises a lever 297 pivoted at its upper end as indicated at 299 on the inside of the left side wall 23 and a similar lever 297 pivoted at its upper end as indicated at 299 on the inside of the right side wall 25. Each lever 297 is biased by a spring 301 to swing rearward against a stop 303 on the respective side wall. Each lever 297 has an inclined triangular cam 305 at its lower end. The arrangement is such that when assembly F is swung out, follower rolls 289 on plate 269 engage the bottom of cams 305 and swing levers 297 forward to a point where rolls 289 clear the rear ends of the cams, whereupon springs 301 snap levers 297 back to their retracted position against stops 303. When assembly F is swung in, follower rolls 289 on plate 269 engage the top of cams 305, and plate 269 is thereby swung away from its retracted position to retract the shift columns and permit the stacks in the primary front columns FC to drop freely. Toward the end of the inward swing of assembly F, rolls 289 ride off the forward ends of the cams 305, and the plate 269 is thereupon returned to its retracted position under the bias of spring 272.

Lever 141 at the right end of shaft 137 on the inside of the right side wall 25 constitutes a control lever adapted for engagement with latches such as indicated at L1, L2 and L3 corresponding, for example, to those shown in Holstein et al. U. S. Patent 2,952,384, issued September 13, 1960. Lever 141 also has ratchet teeth 307 engageable by pawl 309 of a mechanism for compelling full-stroke operation of any ejector FE or RE of the type such as shown in said patent and U.S. Patent 2,823,782. Latch control mechanism such as indicated generally at 311 is provided, this mechanism corresponding essentially to that shown in U.S. Patent 2,952,384, and including front and rear price shafts 313 and 315 for each row of ejectors FE and RE. It will be further understood that coin apparatus such as disclosed in the copending coassigned application of James T. Schuller, Serial No. 799,294, filed March 13, 1959, issued as U.S. Patent 2,991,867, July 11, 1961, is used in conjunction with the latch control mechanism 311. A lever 317 is shown pivoted at 319 on the left side wall and actuated by stud 143. This lever operates a match book dispenser (not shown since it does not constitute a part of this invention), match books dispensed thereby being delivered through a slot 321 in the left side wall into the pan 123. The match book dispenser may be of a type which requires operation by the purchaser of a knob 323 (see FIG. 1) or of a type which automatically dispenses a match book on operation of any ejector.

Operation is as follows:

When any one of the upper ejectors FE is pulled out, the head 41 of that ejector moves forward from under the stack of packs P in the respective front column FC, and the stack drops down onto the shelf 31. The head 41, in moving forward, moves the upper drawbar 43 and the upper drawbar side arms 45 forward.

The side arms 45, in moving forward, swing levers 273 forward. Levers 273 act through links 277 to rock cam levers 279 forward, and cams 287 on levers 279, through engagement with follower rolls 289 on the plate 269, rock plate 269 from its FIG. 8 retracted position to its FIG. 12 position. Fingers 271 on plate 269 engage members 97 on the shift columns SC to swing the shift columns rearward. This relieves the pressure of the front walls of the shift columns on the stacks in the primary front columns FC, so that the stack in the column FC for which the stated ejector FE has been pulled out may drop freely onto shelf 31.

Also, the side arms 45, in moving forward, act to swing levers 139 and 141 forward via engagement of edges 151 of hook formations 153 on arms 45 with studs 149 on levers 139 and 141. Shaft 137 rotates with levers 139 and 141. Lever 141 acts as a control lever in conjunction with latches L1, L2 and L3 in a manner such as will be apparent from U.S. Patent 2,952,384. Latches L1, L2 and L3 are controlled by coin apparatus such as disclosed in the aforesaid U.S. Patent 2,991,867, and it will be understood that shaft 137 acts as a control shaft for the coin apparatus (in the same manner as the shaft 77 shown in said U.S. Patent 2,991,867). In this description of the operation of the machine herein disclosed, it is assumed that a sufficient amount in coin has been inserted by the purchaser for clearing lever 141 for full-stroke operation.

As the side arms 45 move forward, portions of these arms rearward of the downwardly directed notches 255 in the arms come over the studs 263 on arms 261 (see FIG. 12), and hold studs 263 down in upwardly directed notches 257 in the lower drawbar side arms 203. This locks arms 203 and drawbar 201 from being moved forward. Accordingly, all the rear column ejectors FE are locked against being pulled out. Only the one selected ejector FE can be pulled out, the remaining ejectors FE being locked out by the previously mentioned interlock mechanism for the ejectors FE.

Upon pulling out the stated ejector FE, springs 147 and 295 become tensioned, and provide a return bias for the drawbar side arms 45, the drawbar 43 and the stated ejector. Accordingly, upon release of the ejector, arms 45, drawbar 43 and the ejector are returned rearward from their FIG. 12 to their FIG. 8 position. It will be understood that the purchaser may also push in on the ejector. Upon return of the ejector, its head 41 engages the forward end of the lowermost pack of the stack in the respective column FC and pushes it rearward off the shelf 31. The rearward end of the pack first rests on the respective tongue 133 (which is a part of the upper drawbar assembly) as crossbar 129 moves rearward with arms 45, and, as the arms 45 complete their rearward movement, the pack tilts down on and slides off the inclined tongue end 135 and drops down through the respective chute 107 to the pan 123, from which it may be taken out by the purchaser through the access opening 18 in the door 13. It will be observed that the rods 211 extending from the rear column ejectors RE to the rear columns are laterally offset from the front columns FC, all the rods 211 except the extreme left-hand rod 211 lying in planes between the chutes 107 and the extreme left-hand rod 211 lying at the left of the extreme left-hand chute 107. Accordingly, while each rear column is aligned with a respective front column, and the front and rear column ejectors are arranged in horizontal rows one above the other, with each front column ejector aligned with the respective front column, and with the pull-out rod 193 for each rear column aligned with the respective rear column (as is desirable to avoid offsetting of the rear columns from the front columns and to avoid offsetting of the rear column ejectors from the front column ejectors), there is no interference with drop-out of packs from the front columns.

When any one of the lower ejectors RE is pulled out, the head 199 of that ejector moves forward, moves the lower drawbar 201 and the lower drawbar side arms 203 forward, and also moves the respective rod 211 forward. Pusher 219 on flange 213 of the respective rod 211 engages the rearward end of the lowermost pack P of the stack in the respective rear column RC and pushes it forward off shelf 155. Side arms 203, in moving forward, act to swing levers 139 and 141 forward via engagement of rearward fingers 243 on arms 203 with studs 149 on levers 139 and 141. Shaft 137 rotates with levers 139 and 141. Lever 141 acts as a control lever in conjunction with latches L1, L2 and L3 and shaft 137 acts as a control shaft for the coin apparatus in the same manner as when an upper ejector FE is pulled out.

As the side arms 203 move forward, studs 263 are cammed upward into notches 255 in the upper drawbar arms 45 by the rearward edges of notches 257 in arms 203, and are held up in notches 255 by bearing on the upper edges of the portions of arms 203 rearward of notches 257. This locks arms 45 and drawbar 43 from being moved forward. Accordingly, all the front column ejectors FE are locked against being pulled out. Only the one selected ejector RE can be pulled out, the remaining ejectors RE being locked out by the previously mentioned interlock mechanism for the ejectors RE.

Figure 11:
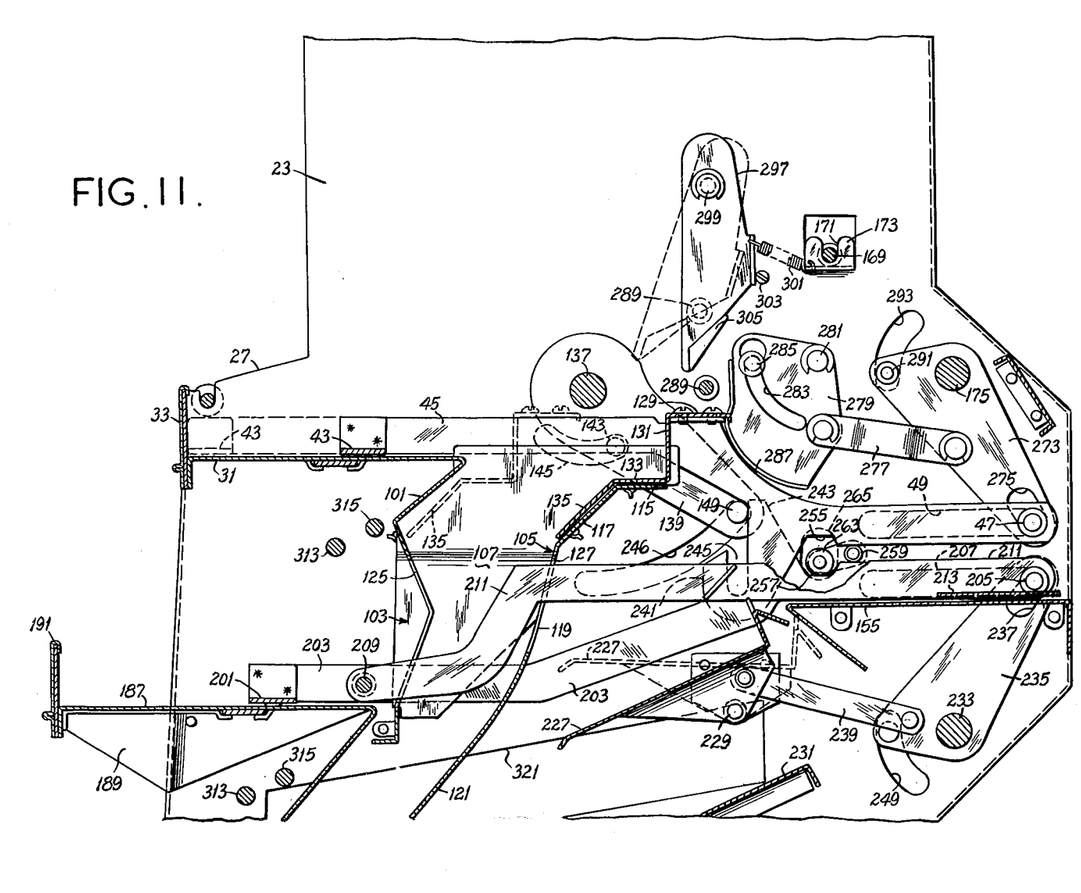
FIG. 11 is a vertical section taken on line 11—11 of FIG. 4.

As the side arms 203 move forward, and as the pack is pushed forward off shelf 155, trap 227 is swung up from its FIG. 8 position to the pack-receiving position indicated in dotted lines in FIG. 11 by the action of cranks 235 and links 239. The pack, sliding forward off shelf 155, drops down onto the trap.

Upon pulling out the stated ejector RE, springs 147 and 251 become tensioned, and provide a return bias for the drawbar side arms 203, the drawbar 201 and the stated ejector RE. Accordingly, upon release of the ejector, arm 203, drawbar 201 and the ejector are returned rearward. Upon return of the ejector, the stack in the respective rear column RC, which stack during ejection of the lowermost pack has been bearing on the respective pusher 219, drops down onto shelf 155. Trap 227 returns to its FIG. 8 inclined pack-delivery position, and the ejected pack slides forward off the trap, drops down onto inclined panel 231, and then slides down panel 231 underneath portion 121 of apron 105 to the pan 123.

Thus, each front column ejector FE is adapted to eject the lowermost item of the stack in the respective front column FC toward the rear, and each rear column ejector RE is adapted to eject the lowermost item of the stack in the respective rear column RC toward the front. With this arrangement, extra machine depth such as would be needed for rearward ejection of items from the rear columns is eliminated. Space underneath the shift columns SC is utilized for the forward ejection of items from the rear columns.

As made clear above, each shift column SC is biased by springs 93 to swing into the respective primary column FC, and is normally held back by engagement of its front wall 85 with the stack in the respective column FC. When the stack in the column FC is depleted (when only two packs remain in column FC as shown in FIG. 9), springs 93 swing the shift column into the column FC as indicated in dotted lines in FIG. 9. The stack in the shift column SC slides off self portion 61 of member 57, and is directed to the bottom of the column FC.

When any front column (the primary column FC and the respective shift column) is sold out, the empty lock incorporated in the head 41 of the respective ejector FE becomes effective to lock that ejector out of operation. When any rear column is sold out, the empty lock 221 becomes effective to lock the respective ejector RE out of operation.

For loading the machine, cabinet door 13 is opened and the front column assembly F is swung out from its vertical dispensing position in the machine above the shelf 31 to the servicing position illustrated in FIG. 7 in which it extends out of the front of the machine, being inclined upward in forward direction. As assembly F is swung out, links 186 pull open the rear column door 181. The stack of packs P remaining in any column FC are then supported by feet 68. As will be apparent from FIG. 14, these feet 68, when assembly F is in its vertical dispensing position, lie slightly below shelf 31, being accommodated in openings 68a in this shelf. With assembly F in servicing position, columns FC and SC, which are open at the top, may be easily loaded from the top, and rear columns RC may be easily loaded from the front through their full-width front openings made accessible by the opening of door 181. When, after loading, assembly F is swung back in to servicing position, cam follower rolls 289 on plate 269 engage cams 305 to swing plate 269 to retract the shift columns SC. This avoids the possibility of the lower edges of the front walls 85 of the shift columns digging into packs in columns FC.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. In a vending machine, a front bank of columns, a rear bank of columns each aligned with a respective front column, each column being adapted to hold a stack of items to be vended, a plurality of independently operable ejectors, one for each front column and one for each rear column, each adapted to eject the lowermost item of the stack in the respective column, the front and rear column ejectors being arranged in horizontal rows one above the other, each front column ejector being aligned with the respective front column, each rear-column ejector including a forward pull-out rod aligned with the respective rear column and a member extending to the rear column offset laterally from the pull-out rod and the respective aligned front column.

2. In a vending machine as set forth in claim 1, each front column ejector being adapted to eject the lowermost item of the stack in the respective front column toward the rear, and each rear column ejector being adapted to eject the lowermost item of the stack in the respective rear column toward the front.

3. In a vending machine, a frame comprising left and right side walls, a front shelf extending between the side walls, a rear shelf extending between the side walls, a front bank of columns above the front shelf, a rear bank of columns above the rear shelf, a plurality of ejectors, one for each front column and one for each rear column, each adapted to be pulled forward by a purchaser and then returned to retracted position, each front column ejector being adapted to support a stack of items to be vended in the respective front column, the stack dropping down onto the front shelf when the ejector is pulled forward and the lowermost item thereof being ejected to the rear when the ejector is returned, each rear column being adapted to hold a stack of items to be vended with the stack supported on the rear shelf, each of the rear column ejectors having a pusher adapted to engage the rear of the lowermost item of the stack in the respective rear column and to push it forward off the rear shelf when the rear column ejector is pulled forward, a first drawbar movable forward and rearward in response to operation of any front column ejector, a second drawbar movable forward and rearward in response to operation of any rear column ejector, a control shaft extending between said side walls, and means operable by the first drawbar for rotating said shaft on operation of any front column ejector, and operable by the second drawbar for rotating the shaft on operation of any rear column ejector.

4. In a vending machine as set forth in claim 3, said means comprising at least one lever on the shaft, and at least one arm extending from each drawbar, the arm extending from the first drawbar having a portion engageable with the lever to rotate the lever and the shaft on operation of any front column ejector, and the arm extending from the second drawbar having a portion engageable with the lever to rotate the lever and the shaft on operation of any rear column ejector.

5. In a vending machine as set forth in claim 4, interlocking means between the drawbar arms for locking second drawbar arm against forward movement when the first drawbar arm moves forward and for locking the first drawbar arm against forward movement when the second drawbar arm moves forward.

6. In a vending machine as set forth in claim 5, said interlocking means comprising a lock member normally engaging one of the drawbar arms, said one arm being formed to cam said lock member into locking engagement with the other arm on forward movement of said one arm, said other arm holding said lock member in locking engagement with said one arm on forward movement of said other arm.

7. In a vending machine, a frame comprising left and right side walls, a front shelf extending between the side walls, a rear shelf extending between the side walls, a front column assembly comprising a plurality of primary columns each adapted to hold a stack of items to be vended and a plurality of shift columns, one for each primary column, each adapted to hold a reserve supply of items, each shift column being mounted for movement from a retracted position in the rear of the respective primary column into the respective primary column, each shift column being biased to move into the respective primary column and normally being held in retracted position by engagement with the stack in the respective primary column, said front column assembly being pivoted on a horizontal axis adjacent the bottom thereof extending transversely across the machine for swinging movement between a vertical dispensing position above the front shelf and a servicing position extending out of the front of the machine, a rear bank of columns above the rear shelf, a plurality of ejectors, one for each primary column and each rear column, each primary column ejector being adapted to eject the lowermost item of the stack in the respective primary column off the front shelf when the front column assembly is in dispensing position, each rear column ejector being adapted to eject the lowermost item of the stack in the respective rear column off the rear shelf, and means for moving the shift columns rearward to relieve their pressure on the stacks in the primary columns in response to operation of any primary column ejector.

8. In a vending machine as set forth in claim 7, means for moving the shift columns rearward to relieve their pressure on the stacks in the primary columns in response to return of said front column assembly from servicing to dispensing position.

9. In a vending machine as set forth in claim 7, said means comprising a rotatable shifter carried by the front column assembly engageable with the shift columns on rotation thereof in one direction to move back the shift columns, and means in the machine engageable with said shifter when the front column assembly is in dispensing position for rotating it in response to operation of any primary column ejector.

10. In a vending machine, a frame comprising left and right side walls, a front shelf extending between said side walls, a rear shelf extending between said side walls at a lower level than the front shelf, a front bank of columns above the front shelf each adapted to hold a stack of items to be vended, a rear bank of columns above the rear shelf each aligned with a respective front column, a row of ejectors, one for each front column, each aligned with a respective front column and adapted to be pulled forward and then returned rearward, and each adapted to support a stack of items in the respective front column, the stack dropping down onto the front shelf when the ejector is pulled forward and the lowermost item thereof being pushed rearward off the shelf by the ejector when the latter returns rearward, a plurality of ejectors, one for each rear column, each including a forward pull-out rod aligned with the respective rear column and located directly below the ejector for the corresponding front column and below the front shelf, a member laterally offset from said pull-out rod and extending to the rear from said pull-out rod in a vertical plane at one side of the corresponding front column, and a pusher carried by said member engageable with the rear of the lowermost item of the stack in the respective rear column for pushing this item forward off the rear shelf on pull-out of the rod.

11. In a vending machine as set forth in claim 10, means at the rear of the front shelf providing a plurality of chutes, one for each front column, each aligned with a respective front column, down which items pushed rearward off the front shelf may drop, said chutes having spaces therebetween for passage of the laterally offset members of certain rear column ejectors.

12. In a vending machine as set forth in claim 10, a pivoted trap extending between the side walls rearward of said chutes and forward of the rear shelf, said trap being swingable between a raised position for receiving an item pushed forward off the rear shelf and a lowered position for allowing said item to slide forward off the trap, said trap normally occupying its lowered position, and means for raising and then lowering the trap in response to operation of any rear column ejector.

13. In a vending machine, a column assembly comprising a plurality of primary columns each adapted to hold a stack of items to be vended, and a plurality of shift columns, each adapted to hold a reserve supply of items, each shift column being mounted for movement from a retracted position in the rear of a respective primary column into the respective primary column, each shift column being biased to move into the respective primary column and normally being held in retracted position by engagement with the stack in the respective primary column, said front column assembly being pivoted on a horizontal axis extending transversely across the machine for swinging movement between a vertical dispensing position in the machine and a servicing position extending out of the front of the machine, and means for moving the shift columns rearward to relieve their pressure on the stacks in the primary columns in response to return of said front column assembly from servicing to dispensing position.

14. In a vending machine, a front shelf and a rear shelf, a front bank of columns above the front shelf and a rear bank of columns above the rear shelf, a plurality of ejectors, one for each front column and one for each rear column, each adapted to be pulled forward by a purchaser from a retracted position and then returned to a retracted position independently of all the other ejectors, each front column ejector being adapted to support a stack of items to be vended in the respective front column, the stack dropping down onto the front shelf when the ejector is pulled forward and the lowermost item thereof being ejected to the rear when the ejector is returned, each rear column being adapted to hold a stack of items to be vended with the stack supported by the rear shelf, each of the rear column ejectors being adapted to be moved forward from a retracted position to push the lowermost item of the stack of the respective rear column forward off said rear shelf, and then moved rearward back to retracted position.

15. In a vending machine as set forth in claim 14, the front bank of columns being mounted for movement between a dispensing position in the machine and a servicing position providing for access to the rear columns from the front for loading the latter.

16. In a vending machine as set forth in claim 15, said front bank being pivoted on a horizontal axis adjacent the bottom thereof extending transversely across the machine for swinging movement between a vertical dispensing position and a servicing position extending out of the front of the machine.

17. In a vending machine as set forth in claim 15, said front bank comprising a plurality of primary columns and a plurality of shift columns, one for each primary column, each shift column being adpated to hold a reserve supply of items and to move from a retracted position in the rear of the respective primary front column into the respective primary front column when the stack in the latter is depleted, said shift columns being movable with said front bank between its dispensing and its servicing positions.

18. In a vending machine, a front shelf and a rear shelf, the rear shelf being at a lower level than the front shelf, a front bank of columns above the front shelf and a rear bank of columns above the rear shelf, a plurality of ejectors, one for each front column and one for each rear column, each adapted to be pulled forward by a purchaser from a retracted position and then returned to retracted position independently of all the other ejectors, the front column ejectors being arranged in a horizontal row, the rear column ejectors being arranged in a horizontal row below the front column ejectors and including members extending to the rear of the columns laterally offset from the front columns, each front column ejector being adapted to support a stack of items to be vended in the respective front column, the stack dropping down onto the front shelf when the ejector is pulled forward and the lowermost item thereof being ejected to the rear when the ejector is returned, each rear column being adapted to hold a stack of items to be vended with the stack supported by the rear shelf, each of the rear column ejectors having a pusher adapted to engage the rear of the lowermost item of the stack in the respective rear column and to push it forward off said rear shelf when the rear column ejector is pulled forward.

19. In a vending machine, a front shelf and a rear shelf, the rear shelf being at a lower level than the front shelf, a front bank of columns above the front shelf and a rear bank of columns above the rear shelf, each rear column being aligned with a respective front column, a plurality of ejectors, one for each front column and one for each rear column, each adapted to be pulled forward by a purchaser from a retracted position and then returned to retracted position independently of all the other ejectors, the front and rear column ejectors being arranged in horizontal rows one above the other, each front column ejector being aligned with the respective front column, each rear column ejector including a forward pull-out rod aligned with the respective rear column and a member extending to the rear column offset laterally from the pull-out rod and the respective aligned front column, each front column ejector being adapted to support a stack of items to be vended in the respective front column, the stack dropping down onto the front shelf when the ejector is pulled forward and the lowermost item thereof being ejected to the rear when the ejector is returned, each rear column being adapted to hold a stack of items to be vended with the stack supported by the rear shelf, each of the rear column ejectors having a pusher adapted to engage the rear of the lowermost item of the stack in the respective rear column and to push it forward off said rear shelf when the rear column ejector is pulled forward.

References Cited in the file of this patent

UNITED STATES PATENTS

| | | |
|---|---|---|
| 1,395,941 | Beattie | Nov. 1, 1921 |
| 1,585,179 | Whipple | May 18, 1926 |
| 2,280,218 | Cook | Apr. 21, 1942 |
| 2,359,397 | Steiner | Oct. 3, 1944 |
| 2,914,215 | Neidig | Nov. 24, 1959 |
| 2,952,384 | Holstein et al. | Sept. 13, 1960 |